April 21, 1936.  F. G. HUGHES  2,037,982

BEARING AND BEARING MOUNTING

Filed Feb. 23, 1933  2 Sheets-Sheet 1

INVENTOR:
FREDERICK G. HUGHES,
BY Gales P. Moore
HIS ATTORNEY.

April 21, 1936.　　　F. G. HUGHES　　　2,037,982
BEARING AND BEARING MOUNTING
Filed Feb. 23, 1933　　　2 Sheets-Sheet 2
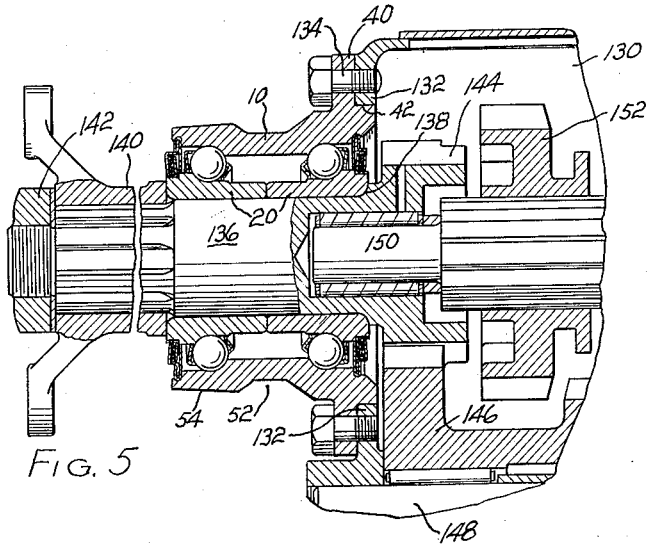
FIG. 5
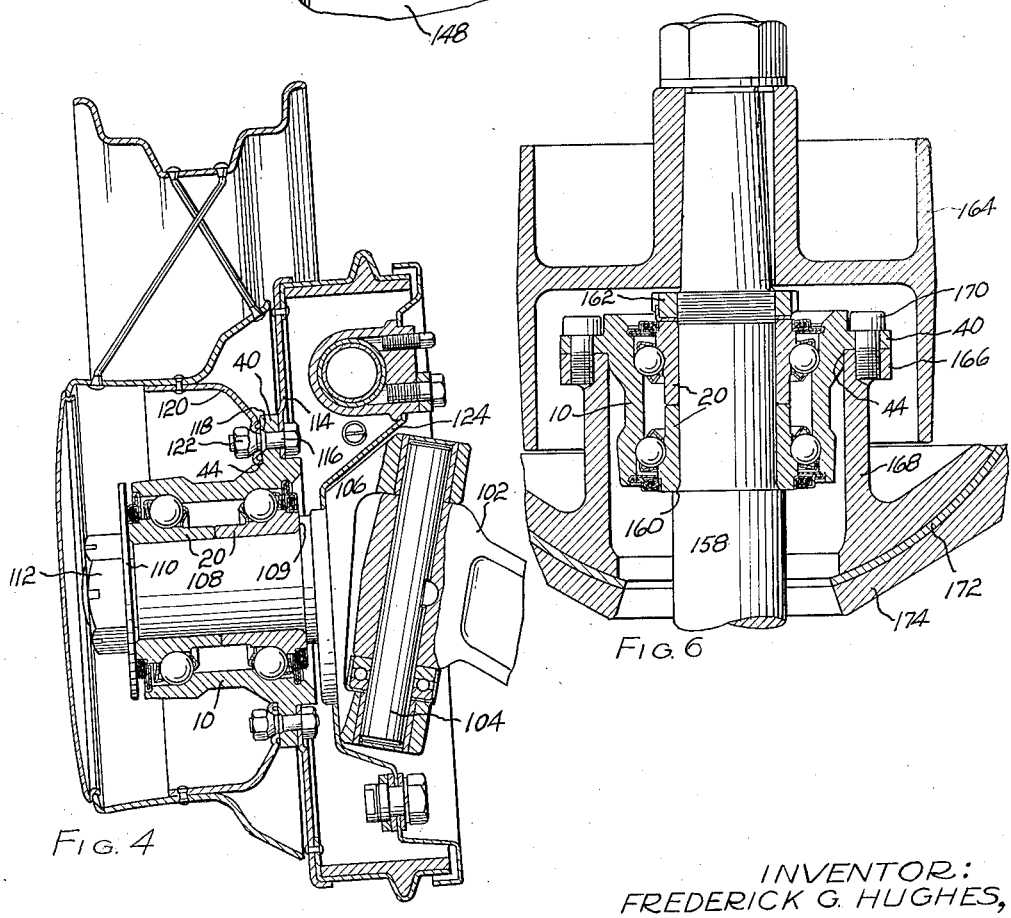
FIG. 4
FIG. 6
INVENTOR:
FREDERICK G. HUGHES,
BY Gales P. Moore
HIS ATTORNEY.

Patented Apr. 21, 1936

2,037,982

UNITED STATES PATENT OFFICE 2,037,982

BEARING AND BEARING MOUNTING

Frederick G. Hughes, Bristol, Conn., assignor, by mesne assignments, to General Motors Corporation, Detroit, Mich., a corporation of Delaware Application February 23, 1933, Serial No. 658,013

14 Claims. (Cl. 308—189)

This invention relates to bearings and to bearing mountings and comprises all of the features of novelty herein disclosed. An object of the invention is to provide an improved antifriction bearing and more especially one that is capable of attachment in selected ways to one of a pair of relatively rotatable members. Another object is to provide an antifriction bearing having means of attaching it to a hub or a casing part for supporting another member in relatvely rotatable relation to such part. Another object is to provide an improved bearing, casing and shaft combination and especially wherein one of the bearing race rings becomes an integral cantilever extension of the casing or similar machine frame member. Still another object is to provide an improved double row bearing capable of being loaded internally as an incident to the mounting of a shaft thereto. Yet another object is to produce a bearing race ring with a plurality of seats providing for selective attachment of one or more members thereto.

To these ends and also to improve generally upon devices of this character, the invention consists in the various matters hereinafter described and claimed. In its broader aspects, the invention is not necessarily limited to the specific structures selected for illustrative purposes in the accompanying drawings in which Fig. 1 is a sectional view of a rear axle, hub and bearing combination.

Fig. 4 is a sectional view of a front axle, hub and bearing combination.

Fig. 5 is a sectional view of a gear box, shaft and bearing combination.

Fig. 6 is a sectional view of a casing, shaft and bearing combination.

Figure 3:
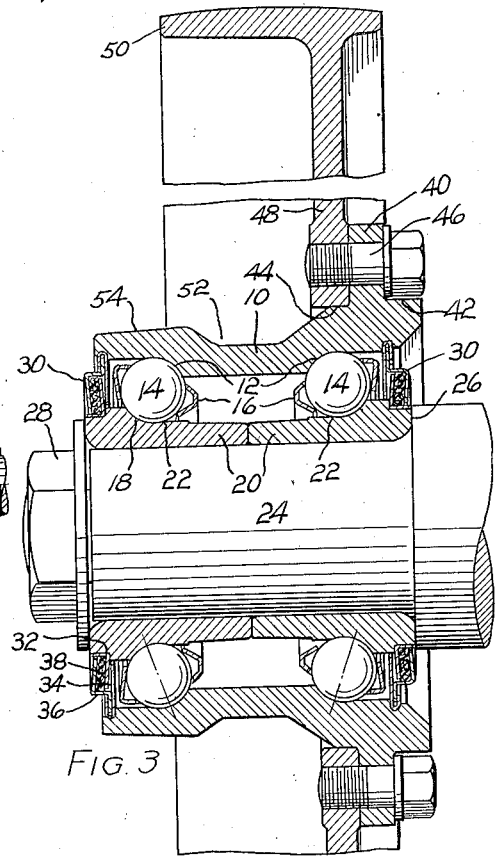
Fig. 3 is a sectional view of a pulley, shaft and bearing combination.

Referring first to Fig. 3 wherein the improved bearing is shown to large scale, the numeral 10 indicates a wide one-piece outer race ring having a pair of angular contact raceways 12 which face away from each other. In the selected disclosure, the bearing is a ball bearing and the raceways have a transverse curvature of arcuate form to conform quite closely to balls 14 arranged in two rows and having suitable separators 16. Opposing raceways 18 are formed on an inner race member preferably comprising a pair of cones or inner race rings 20 which abut against one another. To hold the bearing assembled as a unit-handling structure, the inner race rings 20 are snap-assembled, that is, a rib 22 is formed on each and is of such diameter that elastic deformation of the balls is required in order to get the inner race rings into abutting relation.

The inner race rings 20 are shown mounted on a shaft 24 having a shoulder 26 abutting against the end of one of the race rings while a clamping nut 28 forces an abutment washer against the end of the other race ring. The adjacent ends of the inner race rings are so faced off that when such race rings are firmly abutted, a predetermined internal load is placed upon the rolling elements along angular contact lines which diverge towards the bearing axis as indicated in the lower half of Fig. 3. To protect the bearings from dust and to retain lubricant, suitable seals 30 are applied to the ends of the bearings. The seals may be variously constituted but, in the selected disclosure, each comprises an angular washer 32 pressed on the cone and a pair of washers 34 and 36 carried by a groove in the outer race ring 10. One washer 34 has its outer periphery bent over the outer edge of the other washer 36 which has a cupped portion enclosing a ring of packing felt 38. The seals 30 will also hold the inner race rings from separation.

The outer race ring 10 has an annular attaching flange 40 projecting therefrom and provided with bolt holes. Both sides of the flange are faced off smooth and the flange is preferably spaced away from the ends of the race ring whereby peripheral seats 42 and 44 can be provided at opposite sides of the flange. In Fig. 3, clamping bolts 46 are passed through the holes of the flange 40 and through a flange or web 48 which engages the seat 44. The flange or web 48 can be a part of a frame or casing in which the shaft 24 is revoluble, or the shaft can be fixed and the web 48 be a part of a revoluble member such as a pulley 50 for a band saw or the like. The outer race ring is desirably recessed at 52 to lessen weight and expense, and the end portion 54 is desirably of smaller diameter than the seat 44 and is tapered down towards the end, thereby facilitating assembly of the bearing and its carrying member or carried member. The seat 42 is preferably of larger diameter than the seat 44.

Figure 1:
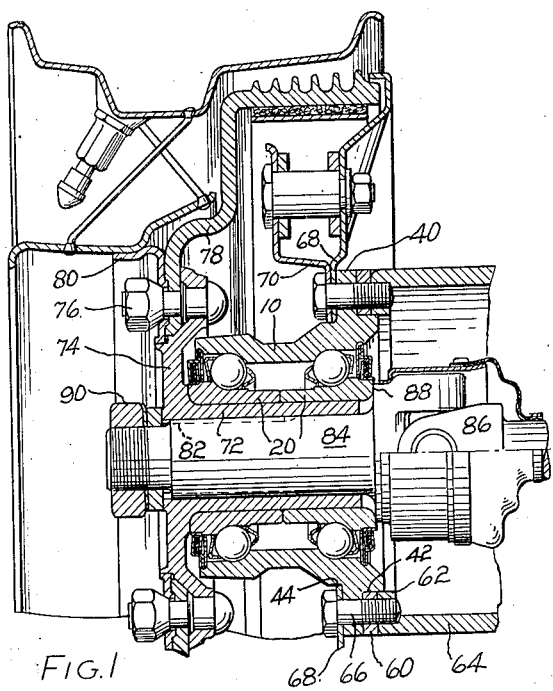

In Fig. 1, a reinforcing ring 60 engages the flange 40 of the bearing at the outer seat 42 and is secured to a flange 62 on a casing or tube 64 by clamping bolts 66. The casing 64 may for instance be a continuous rear axle housing or one of two short, connected tubes such as employed with independently sprung rear wheels wherein the differential driving gearing is mounted on the frame with universal driving connections to the wheels. In the illustrated construction, the bolts 66 are also used to secure brake anchoring members 68 and 70 which engage the inner seat 44. Mounted in the inner race rings 20 is a sleeve or hub 72 having a flange 74 which is clamped by nuts 76 to a brake drum 78 and to a member 80 which is shown as a part of a wire-spoked wheel. The hub 72 has a projecting key 82 engaging a slot in a stub shaft 84 having a universal connection 86 with a drive shaft. A shoulder 88 on the stub shaft engages the end of one of the inner race rings 20 while a nut 90 provides for forcing the flange 74 against the end of the other inner race ring for clamping the inner race rings in the preloaded abutting relation. In this form of the invention, the bearing forms a cantilever extension of the rear axle casing 64, and the seats on both sides of the flange 40 are utilized.

Figure 2:
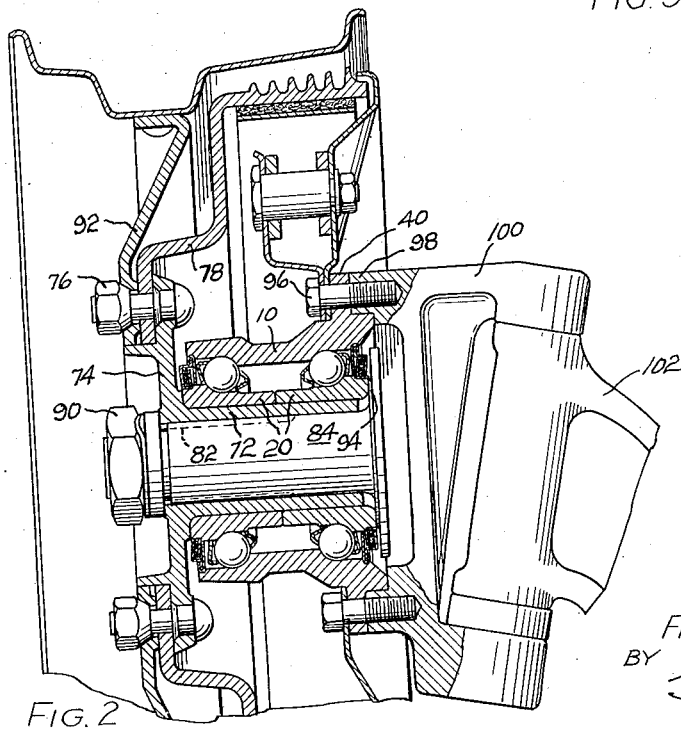
Fig. 2 is a sectional view of a front axle, hub and bearing combination.

In Fig. 2, a front wheel 92 of the disc type is clamped to the hub flange 74, and an abutment flange or collar 94 is provided on the stub shaft 84 for cooperation with the nut 90 in clamping the inner race rings in preloaded abutting relation. Bolts 96 clamp the flange 40 against an annular flange or rim 98 formed on a steering stub axle 100 which is forked to straddle the end of a front axle 102. The bearing forms a cantilever extension of the stub axle and both sides of the flange 40 are utilized for seats.

In Fig. 4, a front axle 102 has a king-pin 104 pivotally supporting a fork 106 on a steering stub axle 108 on which the inner race rings 20 are directly seated. One race ring engages a shoulder 109 and the other engages an abutment washer 110 having a clamping nut 112 to apply internal load to the bearing. A brake drum 114 is clamped to one side of the flange 40 by clamping bolts 116 having coned enlargements 118 engaging countersunk bolt openings in the flange 40. A plate 120 forming part of a wire-spoked wheel is clamped to the other side of the flange 40 by nuts 122. A supporting plate 124 for hydraulic brake actuating means is carried by the stub axle fork 106. In this form of the invention, the bearing is in effect the rotary hub of a wheel.

In Fig. 5, a casing or gear box 130 has an opening with a flanged rim 132 which is clamped to the bearing flange 40 by bolts 134. A shaft 136 directly engages the inner race rings 20 and is provided with a shoulder 138 engaging one of them. A coupling member 140 engages the other race ring and is forced against it by a clamping nut 142 which produces the preloaded condition. A gear 144 on the shaft 136 engages a gear 146 revolubly mounted on a shaft 148 which is anchored to the gear box. A second shaft 150 piloted in the hollow end of the shaft 136 carries the usual shift gear 152. In this form of the invention, the bearing race ring 10 forms a cantilever extension of the gear box 130.

In Fig. 6, a shaft 158 directly engages the inner race rings 20 and the latter are clamped in preloaded condition between a shoulder 160 on the shaft and a nut 162. A drive pulley 164 is keyed to the upper end of the shaft which may be that of a centrifugal separator or laundry extractor. A flanged rim 166 on a casing part 168 engages the outer seat 44 of the bearing and the flange 40 is secured to the rim by bolts 170. The casing part 168 has a parti-spherical or self aligning babbitted bearing at 172 on a support 174.

I claim:
1. In a device of the character described, a casing, a shaft, a self-contained antifriction bearing for mounting the shaft and the casing for relative rotation and comprising inner and outer race members and rolling elements, and one of the race members being rigidly attached to the casing and forming a cantilever extension thereof; substantially as described.

2. In a device of the character described, a casing having a flange, a shaft, an antifriction bearing for mounting the shaft and the casing for relative rotation and comprising inner and outer race members and rolling elements, and one of the race members having a flange rigidly attached to the casing flange and forming an extension of the casing; substantially as described.

3. In a device of the character described, a supporting casing, a shaft, an antifriction bearing for mounting the shaft and the casing for relative rotation and comprising inner and outer race members and rolling elements, one of the race rings having a flange near one end with a peripheral seat at the outer side of the flange, the casing engaging the seat, and bolts for securing the flange to the casing with the flanged race-ring forming a rigid extension of the casing; substantially as described.

4. In a device of the character described, a casing, a shaft, an antifriction bearing for mounting the shaft and the casing for relative rotation and comprising inner and outer race members and two rows of rolling elements, the rows of rolling elements having a predetermined load upon angular contact lines which diverge towards the axis of the bearing, and one of the race members being rigidly attached to the casing to form an extension thereof; substantially as described.

5. In a device of the character described, an axle, a self-contained antifriction bearing having inner and outer race members and rolling elements, means for rigidly securing the outer race member to the axle to form an extension thereof, a wheel hub projecting into the inner race member, and means for securing the hub to said inner race member; substantially as described.

6. A self contained bearing unit and casing extension comprising a race ring, two rows of rolling elements, and a pair of abutting race rings, the pair of race rings having their engaging ends so related to their raceways that a predetermined load is applied to the rolling elements when the race rings are clamped together, and said first mentioned race ring having an apertured attaching flange adapted to be bolted to a casing with the race ring forming a cantilever extension of the casing; substantially as described.

7. In a device of the character described, in combination, a casing and a self-contained bearing unit and casing extension, the bearing unit comprising an outer race ring, two rows of rolling elements, and a pair of inner race rings, the outer race ring having an attaching flange and a peripheral seat at the side of the flange, the casing fitting the seat, and means for rigidly securing the bearing flange to the casing with the outer race ring forming a cantilever extension of the casing; substantially as described.

8. In a device of the character described, in combination, an axle and a self-contained antifriction bearing structure, the bearing having its outer race ring provided with a flange, and means for securing the flange to the axle in a position to form a cantilever extension of the axle; substantially as described.

9. A self-contained bearing unit and casing extension comprising outer and inner race rings and rolling elements, the outer race ring having an apertured attaching flange projecting outwardly adjacent to one end to provide a peripheral seat outside of the flange, a casing fitting over said outside seat, and bolts for securing the flange to the casing with the outer race ring forming a cantilever extension of the casing; substantially as described.

10. A self-contained bearing unit and casing extension comprising outer and inner race rings and rolling elements, the outer race ring having an apertured attaching flange projecting outwardly at a point spaced from the ends to provide peripheral seats at opposite sides of the flange, a casing fitting over one of the seats, brake members fitting over the other seat, and bolts for securing the apertured flange to the seated members; substantially as described.

11. In a device of the character described, in combination, a casing, and a self-contained bearing unit and casing extension, the bearing unit comprising outer and inner race members and rolling elements, the outer race member being rigidly secured to the casing in a position to form an extension of the casing, a hub member projecting into the inner race member, and means for clamping the hub member to the inner race member; substantially as described.

12. In a device of the character described, in combination, a casing, and a self-contained bearing unit and casing extension, the bearing unit comprising outer and inner race members and rolling elements, the outer race member being rigidly secured to the casing in a position to form an extension of the casing, a hub sleeve projecting into the inner race member, a stub shaft passing through the hub sleeve, and means for clamping the inner race member to the stub shaft and the hub sleeve; substantially as described.

13. In a device of the character described, in combination, a casing, and a self-contained bearing unit and casing extension, the bearing unit comprising outer and inner race members and rolling elements, the outer race member being rigidly secured to the casing in a position to form an extension of the casing, a hub sleeve projecting into the inner race member and having an abutment, a stub shaft passing through the hub sleeve and having an abutment, and a nut on the shaft for forcing the abutments against opposite ends of the inner race member; substantially as described.

14. A self-contained bearing unit and axle extension, the bearing having an outer race ring, two rows of rolling elements, and a pair of abutting race rings, means for rigidly securing the outer race ring directly to the end of the axle as an extension thereof, a hub member extending into the inner race rings, and means for clamping the hub member to the inner race rings while making the inner race rings abut with the rolling elements under a predetermined load; substantially as described.

FREDERICK G. HUGHES.